March 10, 1931.  F. G. BAUM  1,795,466
INTERNAL COMBUSTION ENGINE
Filed June 8, 1929
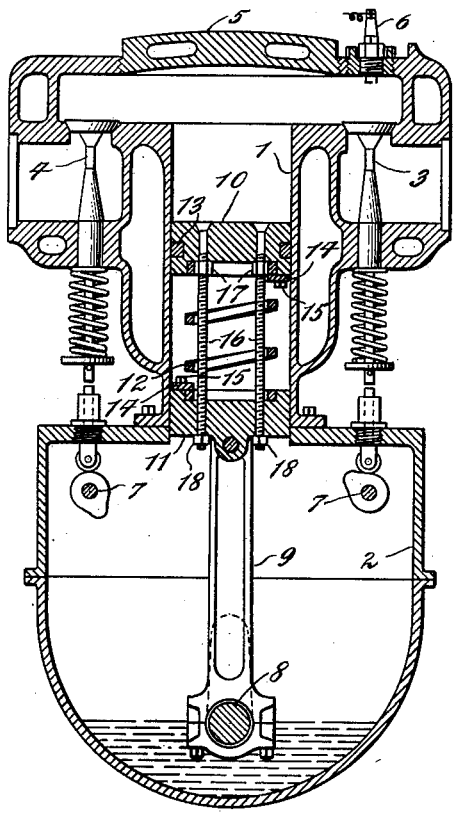
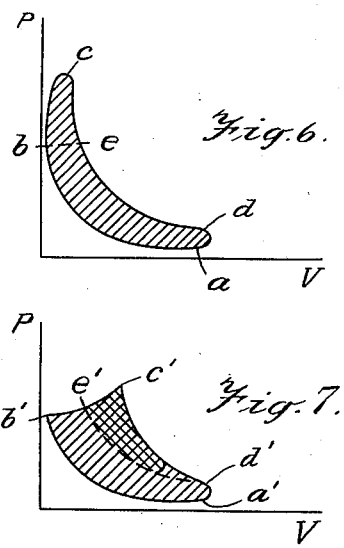
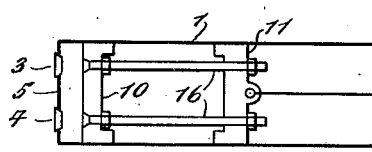
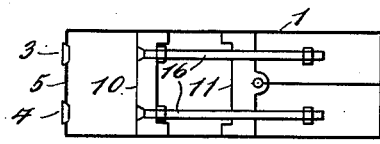
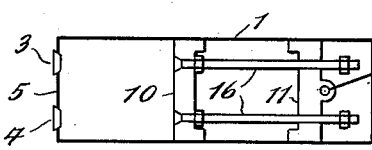
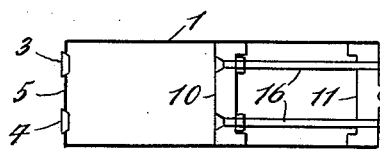
INVENTOR
Frank G. Baum
BY
ATTORNEY Patented Mar. 10, 1931

1,795,466

UNITED STATES PATENT OFFICE

FRANK G. BAUM, OF LUGANO, SWITZERLAND

INTERNAL-COMBUSTION ENGINE

Application filed June 8, 1929. Serial No. 369,359.

Frequently, failure of an internal combustion engine operating under full load conditions is due to the high temperatures at which the engine is compelled to operate, and to remedy this condition is the object of my invention. The invention contemplates an improved internal combustion engine in which the maximum and average working temperatures are reduced.

In internal combustion engines of standard construction, the high operating temperatures are developed by the instantaneous expansion of the gases which are confined in a small space because of the relatively slow piston displacement at this point in the cycle of operation. At ignition, the piston is near the limit of its inward movement, and for a given angular displacement of the crank shaft the piston displacement is relatively small. Consequently, the expanded gases are confined within a space of small cubic content and necessarily develop a very high pressure, and since the temperature is proportional to the pressure developed, the temperature is raised proportionally. The heat resulting from the confinement of the gases is transferred to the working parts of the engine, and under full load conditions, the heat transferred exceeds the capacity of the cooling system, the parts become overheated and are unable to withstand the strain. Therefore, engine failure results.

In accordance with my invention, I have devised an improved internal combustion engine in which the volumetric content of the cylinder is increased according to the expansion of the gases in the cylinder. I accomplish my object by so relating the parts of the engine that the piston displacement depends upon the pressure of the gases when that pressure exceeds the compression pressure, and upon the position of and force exerted on the crank shaft when the pressure of the gas in the cylinder is at or below the pressure of compression. By relating the parts in this way, there is an instantaneous increase in cylinder volume upon igniting the gases, and the pressure, and consequently the temperature, is lowered in proportion. Although my object may be accomplished in a variety of ways, I have illustrated my invention embodied in an internal combustion engine having a double piston connected together by a compression spring, the outer piston being the acting piston and the inner piston acting as a cross-head. By this construction, the ignited gases expand and displace the active piston, the energy being stored in the spring to be given up to the crank shaft as it rotates and assumes the positions to receive it.

A further advantage of my construction is that gas leaking past the active part of the piston may be vented through the cylinder wall between the two parts of the piston and in this way pollution of the oil by gas passing the piston may be minimized.

A detailed description of the illustrated embodiment will now be given in connection with the accompanying drawings in which:

Fig. 1 is a longitudinal section of an internal combustion engine embodying my invention;

Figs. 2 to 5 inclusive are diagrammatic representations of successive positions of the piston during the expansion stroke, the compression spring being omitted for clearness;

Fig. 6 is a reproduction of an indicator card taken from a standard internal combustion engine; and Fig. 7 is a reproduction of an indicator card of my improved internal combustion engine.

In the drawings, there is illustrated an internal combustion engine of the type known as the four cycle T-head engine. The engine comprises the usual cylinder block 1, crank case 2, inlet valve 3, exhaust valve 4, cylinder head 5, spark plug 6, cam shafts 7, crank shaft 8 and connecting rod 9. The cylinder 1 is substantially longer than the ordinary cylinder of an internal combustion engine and is fitted with a two part piston.

The piston comprises the two parts 10 and 11 connected together by a compression spring 12. The inner part or head end 10 which is fitted with a piston ring 13 is the active part thereof, the crank end 11 to which the connecting rod is connected acts as a cross-head or guide. The opposing faces of the two parts of the piston are recessed as shown to receive the end of the compression spring 12 which is held in the recesses by overhanging lugs 14 secured to the piston by means of bolts 15. The parts 10 and 11 are bored at diametrically opposite points to receive threaded tie rods 16. The bores in the outer surface of the head end 10 are countersunk to receive the conical heads of the tie rods which, when in position, are flush with the surface of the piston. Nuts 17 rigidly secure the tie rods in place in the head end 10 of the piston. At the crank end, nuts 18 are provided to regulate the distance between the two parts of the piston and consequently the clearance between the outer surface of the head end 10 and the head of the cylinder. In this way, it is possible to regulate the compression of the gases in the cylinder.

With reference to Figs. 2 to 5 inclusive, the action of the combination of elements hereinbefore described will be pointed out. In the following description, it is assumed for the purpose of more clearly describing the action of the parts that the engine is operating on an advanced spark, the gases being ignited as the piston reaches the limit of its inward movement and the crank shaft is turning over the dead center point. In Fig. 2, the piston has just completed the compression stroke and has reached the limit of its inward movement. Ignition takes place and the gases are expanded displacing the head end 10 of the piston and compressing the spring 12 producing the relation of the parts shown by Fig. 3 and storing up the energy expended by the expansion of the gases in the form of potential energy in the compressed spring 12. Fig. 4 illustrates the relation of the parts at an advance angular displacement of the crank of 90°. It is to be noted, that as the crank shaft rotates the ignited gases continue to expand and as the force is relieved from the compressed spring by the outward movement of the crank end 11 of the piston the head end follows by virtue of the force exerted by the continually expanding gases until that force is less than the force of the spring tending to separate the piston parts which is approximately equal to the compression pressure. Consequently, we have the further displacement of the head end 10 as shown by Fig. 4. In Fig. 5, the piston is illustrated at the end of the expansion stroke when the spring 12 is fully expanded as determined by the position of the nuts 18 on the rods 16 and is about to start the exhaust stroke, to be followed by the intake, compression and expansion, which is repeated as above described.

The effect of the above succession of events may be more readily apparent by a comparison of indicator cards taken from the ordinary internal combustion engine and an engine constructed as hereinbefore described. Such indicator diagrams have been reproduced on the drawings as Figs. 6 and 7. Fig. 6 shows a diagram of the ordinary internal combustion engine, and Fig. 7 illustrates a diagram of my improved engine. In the ordinary engine, compression takes place along the line $a\,b$, at $b$ ignition occurs and the gases tend to expand, and being confined within a small space, the pressure rises rapidly along the line $b\,c$. Piston displacement starts at $c$ and the gases expand along $c\,d$. At $d$ the exhaust valve opens and the spent gases are exhausted along $d\,a$ when the operation is repeated. In my improved engine, the gases are compressed along the line $a'\,b'$, and, as before, at $b'$ ignition occurs. The gases expand instantaneously along $b'\,c'$ and displace the head end 10 of the piston, the pressure rising very slightly. The gases continue to expand along $c'\,d'$ when exhaust occurs along $d'\,a'$ and the above cycle is repeated. Thus, it is seen that the effect of the piston construction is to transfer that part of the diagram $b\,c\,e$ to the position $e'\,d'\,c'$, and that the total area within the curves $a\,b\,c\,d$ and $a'\,b'\,c'\,d'$ which is proportional to the work done during the cycle remains substantially equal for the two engines. Therefore, without decreasing the efficiency of the engine, I have produced an engine which is capable of operating at lower temperatures.

It is to be noted that by my improved construction there is always a space between the active part 10 and the cross-head or guide part 11. An advantage of this construction is that below the limit of movement of the active or head end of the piston a vent may be provided in the cylinder wall through which gases leaking past the piston ring 13 may be vented before reaching the crank case, thereby minimizing the pollution of the oil by escaped gases. Furthermore, the sum of the lengths of the two parts of the piston which factor determines the amount of surface in frictional contact with the cylinder wall may be less than the average piston used in the standard internal combustion engine and consequently the friction between the piston and cylinder wall is reduced accordingly.

It is obvious that various changes may be made in the illustrated embodiment above particularly described within the principle and scope of my invention as expressed in the appended claims.

I claim:

1. In an internal combustion engine, a two part piston comprising a head end part constituting the active part of the piston, a crank end part separated from said head end part adapted to act as a cross-head, and a resilient connection between said parts acting to maintain the parts in spaced relation.

2. In an internal combustion engine, a two part piston comprising a head end part constituting the active part of the piston, a crank end part separated from said head end part, the two parts being of equal diameter, and a resilient compression member between said parts.

3. In an internal combustion engine, a two part piston comprising a head end part constituting the active part of the piston, a crank end part separated from said head end part, the two parts being of equal diameter, a resilient compression member between said parts acting to separate the parts, and means for limiting the separating action of said compression member.

4. In an internal combustion engine, a two part piston comprising a head end part constituting the active part of the piston, a crank end part separated from said head end part, the two parts being of equal diameter, a resilient compression member between said parts acting to separate the parts, and adjustable means for limiting the separating action of said compression member.

In witness whereof, I hereunto subscribe my signature.

FRANK G. BAUM.